No. 626,954. Patented June 13, 1899.
A. WOOLF.
APPARATUS FOR MOLDING OR PRESSING BUNCHES FOR CIGARS.
(Application filed Nov. 1, 1898.)
(No Model.) 2 Sheets—Sheet 1.
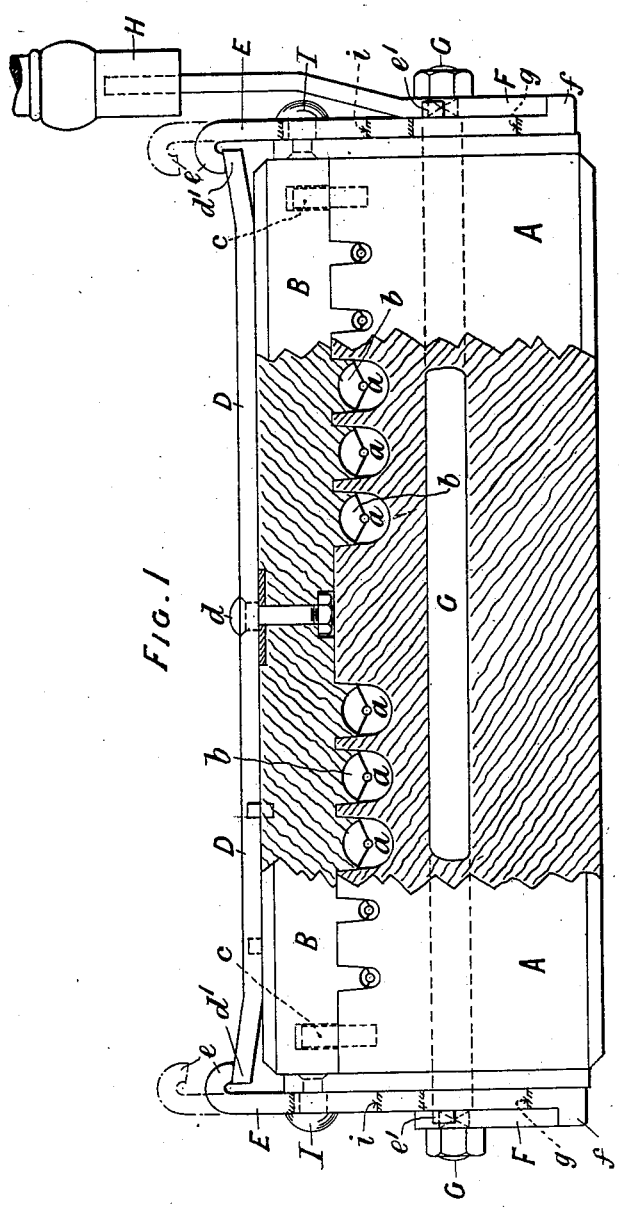
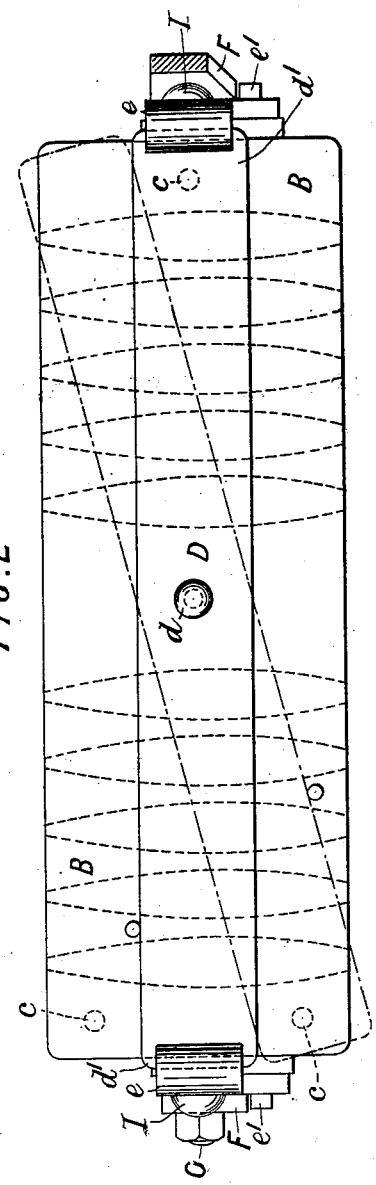

No. 626,954. Patented June 13, 1899.
A. WOOLF.
APPARATUS FOR MOLDING OR PRESSING BUNCHES FOR CIGARS.
(Application filed Nov. 1, 1898.)
(No Model.) 2 Sheets—Sheet 2.

UNITED STATES PATENT OFFICE.

ASHER WOOLF, OF LONDON, ENGLAND.

APPARATUS FOR MOLDING OR PRESSING BUNCHES FOR CIGARS.

SPECIFICATION forming part of Letters Patent No. 626,954, dated June 13, 1899.

Application filed November 1, 1898. Serial No. 695,234. (No model.)

*To all whom it may concern:*

Be it known that I, ASHER WOOLF, gentleman, a resident of Bruce House, 21 Victoria Park road, London, E., England, have invented new and useful Improvements in Apparatus for Molding or Pressing Bunches for Cigars and Like Articles, (for which an application for patent has been filed in Great Britain, dated July 4, 1898, No. 14,723,) of which the following is a full, clear, and exact description.

My invention relates to apparatus for molding or pressing "bunches" for cigars and the like articles, and has for its object to provide a handy tool whereby to enable the workman to press or mold the bunches for cigars (or other articles) to the desired form in small quantities as the work of manufacture proceeds and to leave them under pressure for the time necessary to bring them to their required or finished form.

The invention consists, essentially, in the means whereby the parts of the mold may be readily closed together and subjected to the required pressure, and it will be described with reference to the accompanying drawings, forming part of this specification, wherein—

Figure 3:
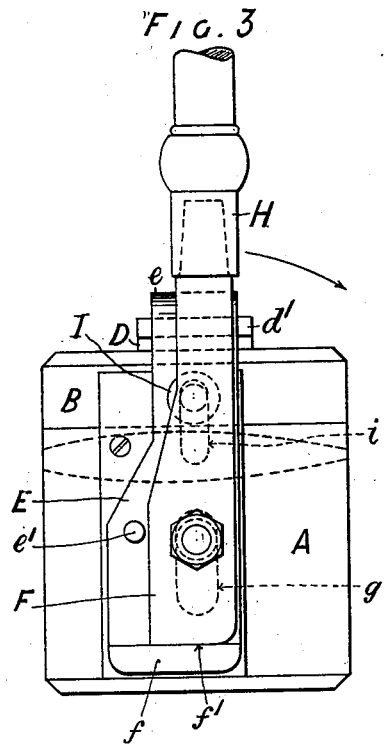
Figure 4:
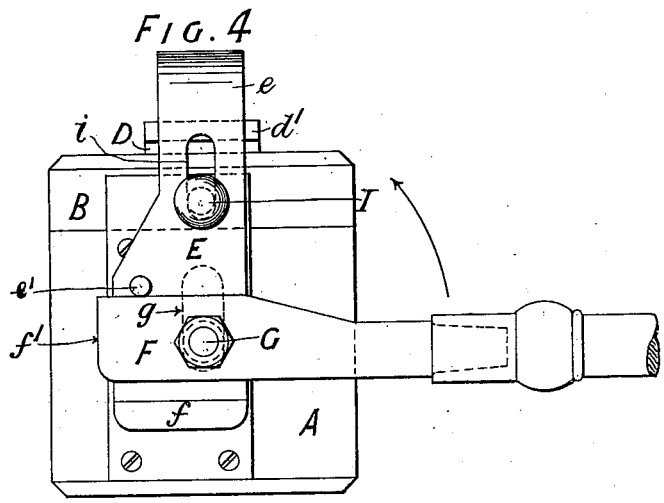

Figure 1 represents a front elevation, partly in section, of a pair of molds constructed according to my invention, the molds being in the closed position. Fig. 2 is a plan of the same. Figs. 3 and 4 are elevations of one end, showing the closing mechanism in the operative and inoperative positions, respectively.

The molding and pressing apparatus comprises a two-part mold of the usual form—namely, a bed-mold A, having transverse cavities $a$ of approximately semicircular section at the lower part, with vertical sides at the upper part and of a length and configuration corresponding to the form to which it is desired to mold the bunches for cigars or other articles, and a removable top mold B, having on its lower face plungers or projections $b$ of a form adapted to fit between the vertical sides of the cavities $a$ and of approximately half-round form in cross-section. The bunches for cigars or other articles to be molded are placed in the cavities $a$ and the coincidence of the top mold with the bottom mold, and the vertical motions of the former in the pressing operation are insured by steady-pins $c$ on the one entering holes in the other. The pressure is applied and maintained by the following combination of mechanism.

D is a pressure-bar pivoted at $d$ on top of the mold B, so that its ends may be swung out of the way to admit of insertion or removal of the mold or be brought into such position that its ends project sufficiently beyond the ends of the top mold B to enable them to be engaged by the upper hooked ends $e$ of presser-slides E, fitted to slide up and down on the ends of the bottom mold A, the two presser-slides being actuated simultaneously by a pair of cams F, fast upon the same shaft G, which extends longitudinally through or beneath the bottom mold and is provided with a removable lever-handle H for operating it. The shaft G passes through a vertical slot $g$ in each of the presser-slides E, by which slots $g$ and by fixed studs I, passing through slots $i$, the said plates are guided in their up-and-down movement. The cams F when turned so as to effect the closure of the mold act on outwardly-turned flanges $f$ at the lower ends of the slides E and are of such radius that when turned into operative position the hooks $e$ will be caused to press upon the ends of the bar D and draw down the top mold B tightly upon the bed-mold A, the extent of the downward movement of the slides E being slightly greater than that of the top mold B, so as to insure perfect closure of the mold, the continued descent of the slides E after the top mold B has come to rest being permitted by the upturned ends $d'$ of the presser-bar D acting as very stiff springs. Said springs also serve in conjunction with a flat $f'$ on each cam to limit the motion of the shaft, so that the cams will be self-retaining in operative position and will maintain the pressure on the molds as long as may be required. The slides E are raised so as to permit of the bar D being swung aside and the molds A B being separated by the cams F when turned in the reverse direction engaging with studs $e'$ on the slides.

I claim—

1. An apparatus for molding and pressing bunches for cigars and like articles, consisting in the combination with a two-part mold having a swinging spring-bar centrally pivoted on the top of the upper part of the mold, the bar having upwardly-curved ends projected beyond the ends of the mold, of mechanism for applying and maintaining pressure, consisting of vertically-guided presser-slides adapted to slide on the ends of the lower part of the mold and adapted to engage with the ends of the swinging bar, the presser-slides having outwardly-projecting flanges at their lower portions, and of a shaft mounted in the lower part of the mold and provided with an operative hand-lever and with cams adapted to act simultaneously on the flanges of the two presser-slides so as to apply pressure through the presser-slides to the cross-bar and to the top part of the mold, the cams having flat portions on their acting surfaces, whereby to cause the cams to be self-retaining when in active position.

2. In an apparatus for pressing cigar-bunches, the combination of a two-part mold, a swinging spring-bar pivoted to one part of the mold and having its ends projected beyond the mold, presser-slides mounted at the ends of the other part of the mold and having end portions capable of engaging respectively with the ends of the swinging bar, the presser-slides having each a portion projected outward from the mold, a rock-shaft mounted in the mold-section that carries the presser-slides, cams attached to the rock-shaft and respectively coacting with the outwardly-projecting portions of the presser-slides, and means in connection with the shaft for applying pressure thereto.

3. In an apparatus for pressing cigar-bunches, the combination of a two-part mold, a swinging bar pivoted to one part of the mold and having its ends projecting beyond the mold, presser-slides mounted at the ends of the other part of the mold and having end portions capable of engaging respectively with the ends of the swinging bar, a rock-shaft mounted on the mold-section that carries the presser-slides, cams attached to the rock-shaft and respectively coacting with the presser-slides, and means in connection with the shaft for applying pressure thereto.

Signed by me, the said ASHER WOOLF, this 17th day of October, 1898.

ASHER WOOLF.

In presence of—
C. G. CLARK,
T. W. KENNARD.